(12) United States Patent
Mialhe (10) Patent No.: US 9,213,097 B2
(45) Date of Patent: Dec. 15, 2015

(54) AIRCRAFT COMPRISING AN ONBOARD WEATHER RADAR ANTENNA PROVIDED WITH INCLINED PANELS

(71) Applicant: Airbus Operations (SAS), Toulouse (FR)

(72) Inventor: Christophe Mialhe, Giroussens (FR)

(73) Assignee: Airbus Operations SAS, Toulouse (FR)

( * ) Notice: Subject to any disclaimer, the term of this patent is extended or adjusted under 35 U.S.C. 154(b) by 186 days.

(21) Appl. No.: 14/099,531

(22) Filed: Dec. 6, 2013

(65) Prior Publication Data

US 2014/0159949 A1    Jun. 12, 2014

(30) Foreign Application Priority Data

Dec. 10, 2012    (FR) ..................................... 12 61844

(51) Int. Cl.
*G01S 13/95*    (2006.01)
*H01Q 1/42*    (2006.01)
*B64C 1/36*    (2006.01)
*H01Q 1/28*    (2006.01)
(Continued)

(52) U.S. Cl.
CPC .................. *G01S 13/953* (2013.01); *B64C 1/36* (2013.01); *G01S 13/426* (2013.01); *G01S 13/95* (2013.01); *H01Q 1/28* (2013.01); *H01Q 1/281* (2013.01); *H01Q 1/42* (2013.01); *H01Q 21/20* (2013.01)

(58) Field of Classification Search
CPC ......... G01S 13/95; G01S 13/953; H01Q 1/12; H01Q 1/125; H01Q 1/18; H01Q 1/28; H01Q 1/281; H01Q 1/286; H01Q 1/42; B64C 1/36
USPC ...... 342/26 R, 26 B; 343/705, 711, 712, 713, 343/714, 718, 872, 873; 244/121
See application file for complete search history.

(56) References Cited

U.S. PATENT DOCUMENTS 3,925,783 A * 12/1975 Bleday et al. .................. 343/705
4,073,985 A *  2/1978 San Miguel .................. 428/35.7
(Continued)

FOREIGN PATENT DOCUMENTS

EP    2246933    11/2010
GB    2409361     6/2005
(Continued)

OTHER PUBLICATIONS

French Search Report, Jul. 4, 2013.

*Primary Examiner* — Peter Bythrow
(74) *Attorney, Agent, or Firm* — Greer, Burns & Crain ltd.

(57) ABSTRACT

An aircraft comprising a fuselage and a radome fixed to the fuselage. The radome defines a housing and the fuselage comprises a sealed bulkhead closing the housing. A weather radar antenna comprises a main panel. A plurality of peripheral panels are arranged around the main panel, inclined from a planar surface of the main panel and located on the same side of the planar surface. The housing contains the antenna which is mounted on the fuselage through a mechanical support fixed to the fuselage and to the weather radar antenna on the same side of the planar surface as the peripheral panels. A bird strike shield is located between the antenna and the sealed bulkhead. The shield comprises a dome with a top and a base, the base being fixed to the aircraft fuselage. An opening is formed at the top of the dome through which the mechanical support passes.

4 Claims, 12 Drawing Sheets

(51) Int. Cl.
*H01Q 21/20* (2006.01)
*G01S 13/42* (2006.01)

(56) References Cited

U.S. PATENT DOCUMENTS

| | | | | |
|---|---|---|---|---|
| 5,062,589 | A * | 11/1991 | Roth et al. | 244/117 R |
| 5,323,170 | A * | 6/1994 | Lang | 343/872 |
| 5,662,293 | A * | 9/1997 | Hower et al. | 244/133 |
| 5,691,736 | A * | 11/1997 | Hunn et al. | 343/872 |
| 6,107,976 | A * | 8/2000 | Purinton | 343/872 |
| 6,292,134 | B1 | 9/2001 | Bonyopadhyay | |
| 7,766,277 | B2 * | 8/2010 | Anderson et al. | 244/121 |
| 7,967,253 | B2 * | 6/2011 | Ferguson et al. | 244/130 |
| 8,085,207 | B2 * | 12/2011 | Miller et al. | 343/711 |
| 8,123,167 | B2 * | 2/2012 | Olmi et al. | 244/121 |
| 8,434,717 | B2 * | 5/2013 | Meyer et al. | 244/121 |
| 8,931,738 | B2 * | 1/2015 | White et al. | 244/121 |
| 2003/0071753 | A1 * | 4/2003 | Vacanti | 342/173 |
| 2006/0022088 | A1 * | 2/2006 | Dazet et al. | 244/121 |
| 2006/0125701 | A1 * | 6/2006 | Rotta | 343/708 |
| 2010/0271274 | A1 * | 10/2010 | Gibson et al. | 343/705 |
| 2011/0125349 | A1 * | 5/2011 | Ace | 701/14 |
| 2012/0200447 | A1 * | 8/2012 | Vacanti | 342/29 |
| 2013/0320103 | A1 * | 12/2013 | Margalit | 239/1 |
| 2015/0130672 | A1 * | 5/2015 | Cordone | 343/705 |

FOREIGN PATENT DOCUMENTS

JP H05110327 4/1993
JP 2000329843 11/2000

* cited by examiner

AIRCRAFT COMPRISING AN ONBOARD WEATHER RADAR ANTENNA PROVIDED WITH INCLINED PANELS

CROSS-REFERENCES TO RELATED APPLICATIONS

This application claims the benefit of the French patent application No. 1261844 filed on Dec. 10, 2012, the entire disclosures of which are incorporated herein by way of reference.

BACKGROUND OF THE INVENTION

The invention relates to an aircraft comprising an onboard weather radar antenna fitted with inclined panels.

Onboard weather radar systems are usually installed in the nose cone of aircraft. They detect weather conditions on the aircraft trajectory.

Figure 1:
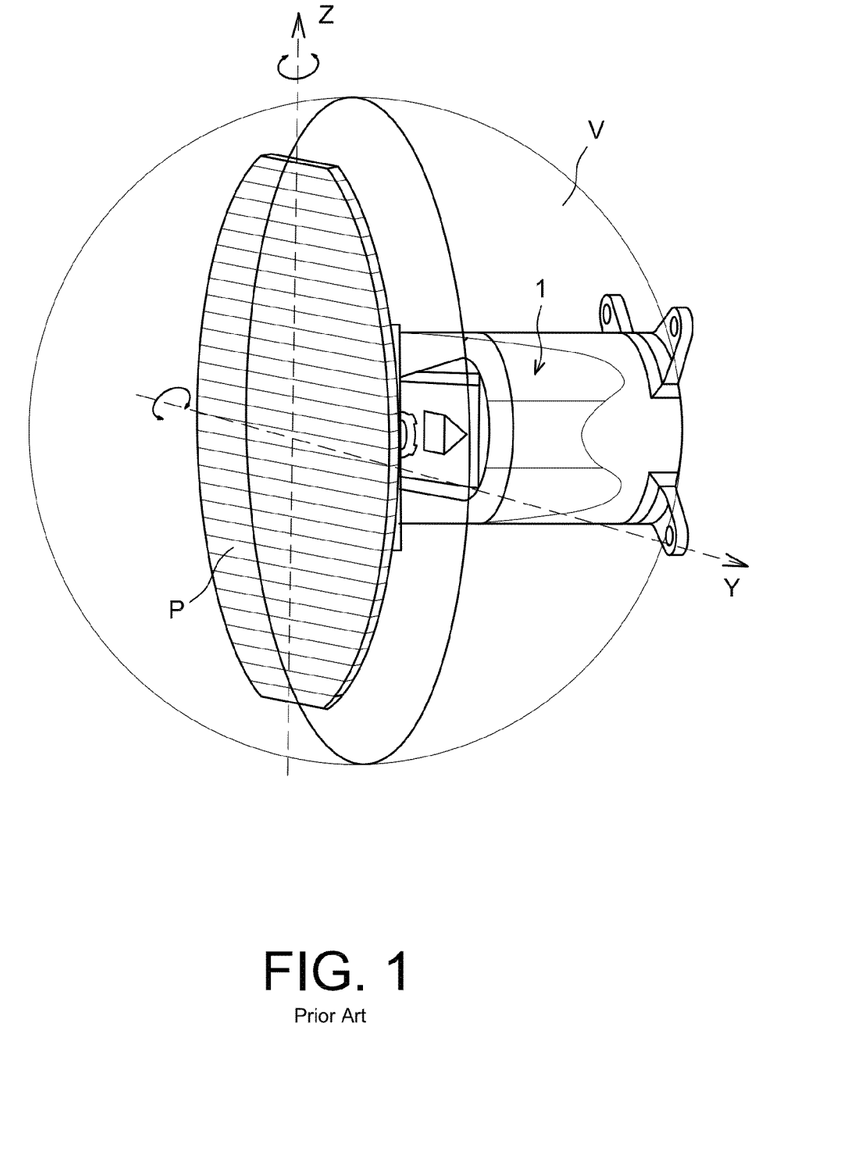
FIG. 1, described above, shows an onboard weather radar antenna according to the prior art.

FIG. 1 shows the known architecture of an onboard weather radar antenna. The antenna comprises an approximately circular panel P fixed on a mechanical support 1. The panel P is connected to a source of electromagnetic waves (not shown in the figure). The circle that is defined by the panel P is centered in an orthogonal coordinate system (Y, Z), the Y and Z axes are coincident with a horizontal and a vertical respectively when the aircraft is on the ground. The panel P is capable of moving around the Y and Z axes in the (Y, Z) coordinate system, to scan through the space in front of the aircraft. The antenna is installed behind a radome (not shown in the figure), that protects it from atmospheric disturbances and relative wind. The radome is composed of a material transparent to wavelengths transmitted and received by the antenna.

The ARINC (Aeronautical Radio INCorporated) standard that fixes communication standards inside aircraft and between aircraft and the ground also fixes geometric constraints for installation of the antenna behind the radome. These geometric constraints are shown in FIG. 1 by the spherical volume V. The volume V defines the space dedicated to the weather radar antenna.

Figure 2A:
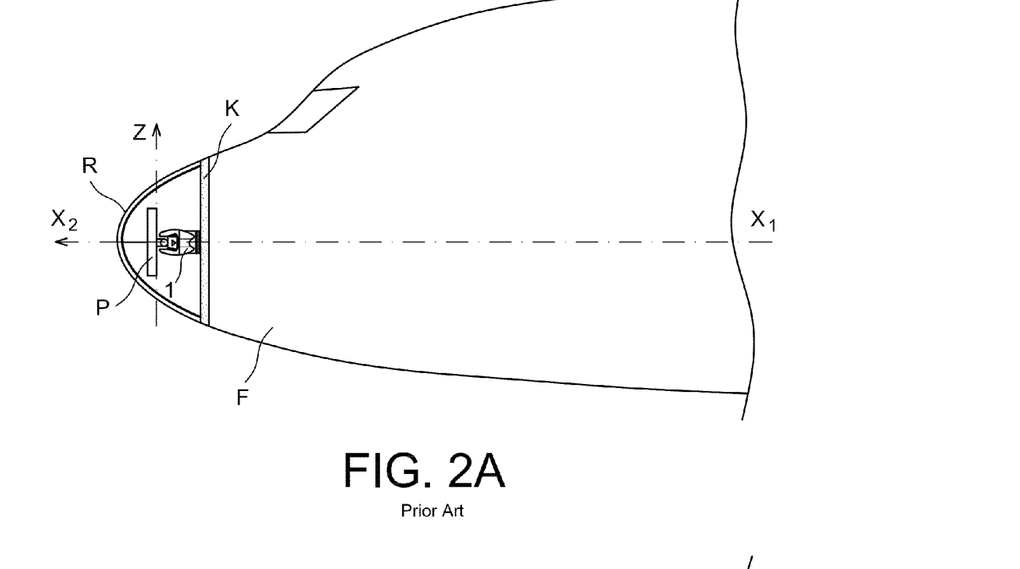
FIGS. 2A-2C, described above, show different orientations of an onboard weather radar antenna in the nose cone of an aircraft, according to prior art.
Figure 2B:
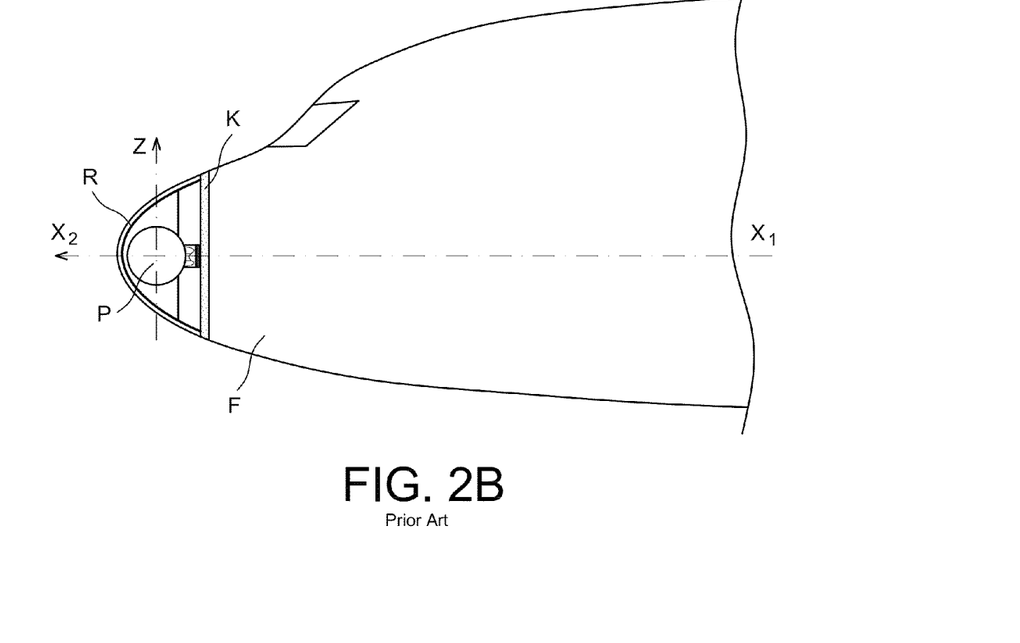
Figure 2C:
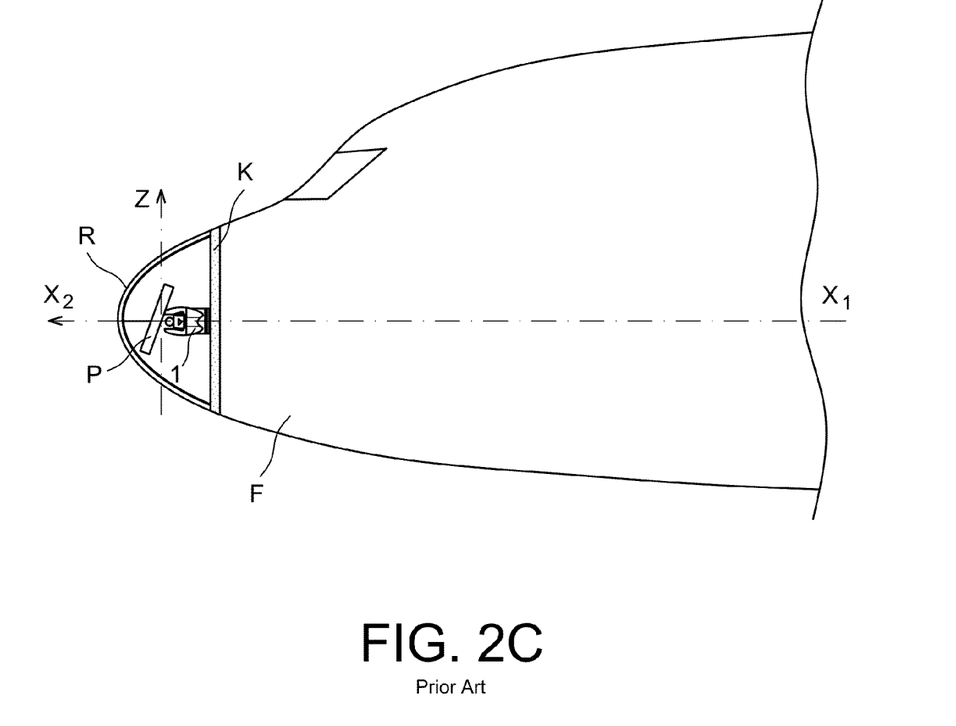

Modifications in the orientation of the panel P in the volume V defined by the ARINC standard are shown in FIGS. 2A to 2C. The weather radar antenna is positioned in a housing delimited by a radome R and a sealed wall K fixed to the aircraft fuselage F. The panel P of the antenna is fixed on the mechanical support 1. FIG. 2A shows the case in which the antenna panel P is located in a plane perpendicular to the longitudinal axis X1X2 of the aircraft. In FIGS. 1 to 2C, the Z axis represents the vertical axis or the height, considered when the aircraft is on the ground. FIG. 2B shows the case in which the antenna panel is at its stop for an azimuth rotation, in other words a rotation about the Z axis. FIG. 2C shows the case in which the antenna panel is at its stop for a rotation in elevation, in other words about the Y axis perpendicular to the Z and X1X2 axes. In a manner well known to aircraft manufacturers and as shown in the figures described above, modifications to the orientation of the panel P in azimuth and in elevation require a large antenna housing, thereby significantly increasing the length of aircraft (along the X1X2 axis).

The invention is aimed at reducing the dimensions of the housing necessary to change the orientation of an onboard weather radar antenna in an aircraft.

SUMMARY OF THE INVENTION

To achieve this, the invention relates to an aircraft comprising a fuselage and a radome fixed to the fuselage, the radome defining a housing, the fuselage comprising a sealed bulkhead closing the housing, a weather radar antenna comprising a main panel with a plane surface capable of transmitting and receiving an electromagnetic wave and a plurality of peripheral panels arranged around the main panel and each having a surface capable of transmitting and receiving an electromagnetic wave, the peripheral panels being inclined from the plane surface of the main panel and placed on the same side of a plane that contains the plane surface of the main panel, the antenna being contained in the housing and mounted on the fuselage through a mechanical support, the mechanical support being fixed firstly to the fuselage and secondly to the weather radar antenna on the same side of the plane that contains the plane surface of the main panel of the antenna, as the peripheral panels of the antenna, the aircraft also comprising a bird strike shield. The bird strike shield is located between the antenna and the sealed bulkhead and is in the form of a dome with a top and a base, the base being fixed to the aircraft fuselage and an opening being formed at the top of the dome through which the mechanical support can pass.

According to an additional characteristic of the invention, the peripheral panels are all inclined at the same angle from the plane surface of the main panel.

According to another characteristic of the invention, the peripheral panels are plane.

According to yet another characteristic of the invention, the mechanical support is capable of moving the weather radar antenna in rotation about an axis perpendicular to the plane that contains the plane surface of the main panel of the antenna.

BRIEF DESCRIPTION OF THE DRAWINGS

Other characteristics and advantages of the invention will become clear after reading the following description with reference to the appended figures, among which.

The same references refer to the same elements in all figures.

DETAILED DESCRIPTION OF THE PREFERRED EMBODIMENTS

Figure 3A:
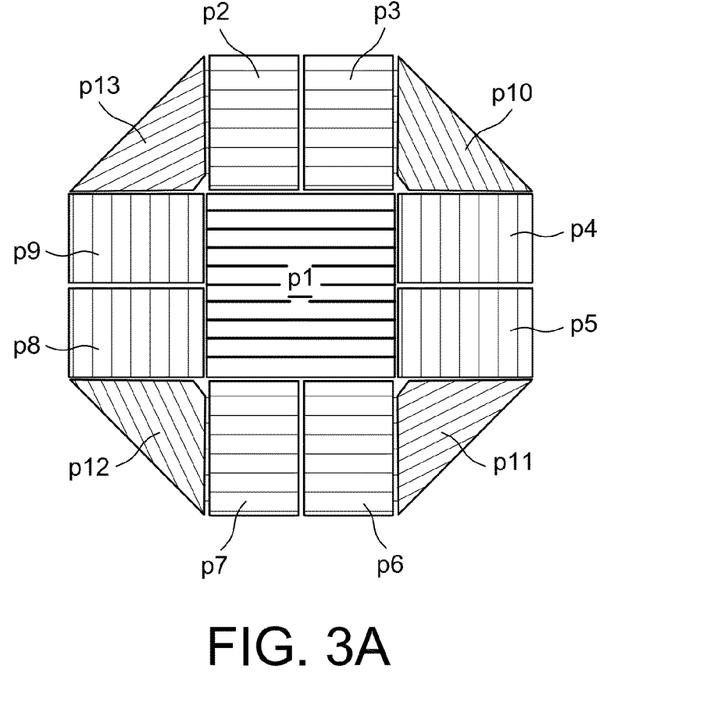
FIGS. 3A-3C show a top view, a perspective view and a side view respectively as a non-limitative example of a set of panels that form part of an onboard weather radar antenna according to the invention.
Figure 3B:
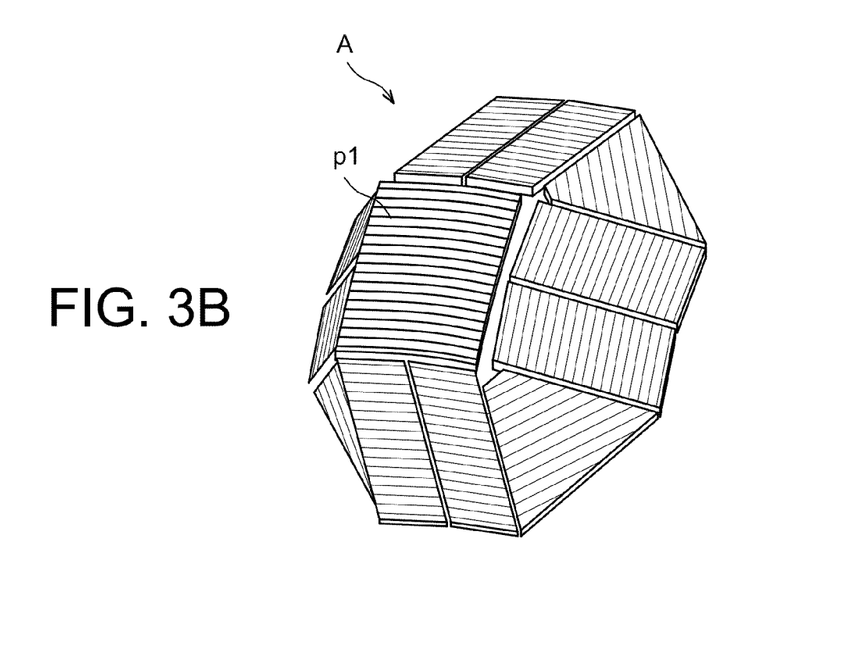
Figure 3C:
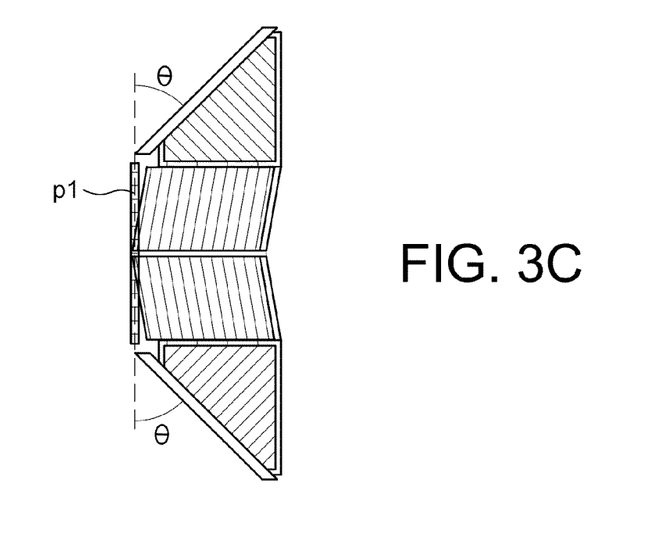

FIGS. 3A, 3B and 3C show a top view, a perspective view and a side view respectively and non-limitatively of a set of panels that form part of an onboard weather radar antenna according to the invention.

The antenna comprises a set of thirteen distinct panels p1-p13 assembled side by side. A first panel p1 called the main panel is rectangular in shape and has a plane surface S.

Eight p2-p9 of the other twelve panels called the peripheral panels are rectangular and are identical in shape and are distributed in pairs around the panel p1. Panels p2 and p3 are placed side by side, and panels p4 and p5, panels p6 and p7, and panels p8 and p9 are also placed side by side. Two panels placed side by side define a rectangular area approximately identical to the area of the panel p1. The rectangle formed by panels p2 and p3 defines a side that is adjacent to a first side of the rectangle formed by the panel p1. The rectangle formed by panels p4 and p5 defines a side that is adjacent to a second side of the rectangle formed by the panel p1. The rectangle formed by panels p6 and p7 defines a side that is adjacent to a third side of the rectangle formed by the panel p1. The rectangle formed by panels p8 and p9 defines a side that is adjacent to the fourth side of the rectangle formed by the panel p1. Each of the other four panels p10-p13 that make up the antenna are approximately in the shape of an isosceles triangle, the length of the two equal sides of the isosceles triangle being almost equal to the length of the side of the panel p1. A first almost triangular panel p10 is placed between panels p3 and p4 such that one of the two equal sides of the panel p10 is adjacent to one side of the panel p3 and the second equal side is adjacent to one side of the panel p4. A second almost triangular panel p11 is placed between panels p5 and p6 in the same way as panel p10 is placed between panels p3 and p4. A third almost triangular panel p12 is placed between panels p7 and p8 in the same way as panel p10 is placed between panels p3 and p4. The fourth almost triangular panel p13 is placed between panels p9 and p2 in the same way as panel p10 is placed between panels p3 and p4.

According to the invention, all peripheral panels p2-p13 are located on the same side of the plane that contains the plane surface S of the main panel 1, each panel p2-p13 having a plane surface at an angle θ with the plane surface of the main panel. The peripheral panels are on either of the two sides of the plane that contains the surface S of the main panel. Thus, with reference to the plane that contains the surface S of the main panel, the angle θ will for example be between +60° and −60°, the interval [+5°, −5°] being omitted.

Each of the panels p1-p13 of the radar antenna according to the invention has exactly the same structure as the panel P according to the prior art. Each panel is thus composed of a set of adjacent sections along an axis included in the plane of the panel when the panel is plane. One or more of the uprights perpendicular to this axis guide electromagnetic waves towards the sections. The sections are perforated at their ends so that electromagnetic waves can be transmitted. Similarly, each panel of the radar antenna according to the invention is powered by electronic means similar to the means used to power the panel P according to the prior art.

Surface areas of panels p1-p13 are given non-limitatively below as an example:

panel p1: area s1=90000 mm2;
panels p2-p9: area s2=41643 mm2 each;
panels p10-p13: area s3=38700 mm2 each.

Therefore the total area Sa of the set of panels p1-p13 is:
Sa=577900 mm2.

In comparison, the area Sb of the flat antenna P according to prior art is:
Sb=451645 mm2.

Advantageously, it can be seen that the area Sa of the radar antenna according to the invention as shown in FIGS. 3A-3C is 28% larger than the area Sb.

With the invention, not all antennas are powered simultaneously and consequently they do not transmit or do not receive simultaneously. Transmission and reception sequences are alternated in many different possible ways. The following transmission/reception sequences of the panels p1-p13 can be envisaged as non-limitative examples, the magnitude EpX and the magnitude Rpx representing a transmission instant and a reception instant respectively of panel px:

1st sequence: Ep1/Ep2/Rp1/Rp2/Ep3/Ep4/Rp3/Rp4/Ep5/Ep6/Rp5/Rp6, etc.,

2nd sequence: Ep1/Rp1/Ep2/Rp2/Ep3/Rp3/Ep4/Rp4, etc.,

3rd sequence: Ep1/Rp5/Ep4/Rp7/Ep6/Rp9/Ep8/Rp11/Ep10, etc.

Many other sequences can also be envisaged.

The area of each panel p1-p13 is less than the area of the flat antenna P according to prior art. Consequently, by applying alternating transmission and reception sequences for the antenna, the instantaneous transmission power of the radar antenna according to the invention is less than the instantaneous transmission power of the radar antenna according to prior art. Consequently the radar antenna according to the invention requires less energy to transmit than the radar antenna according to prior art. The result is that with the invention, the circuits that generate the electromagnetic wave can advantageously be smaller than circuits according to prior art. Therefore, they can be lighter in weight and less cumbersome, thus leading to a reduction in the weight and cost of the radar.

Conversely, a better radar resolution can be obtained than was possible in prior art because the power density of the antenna according to the invention is higher. To achieve this, the antenna transmission power is kept the same as in prior art.

Figure 4:
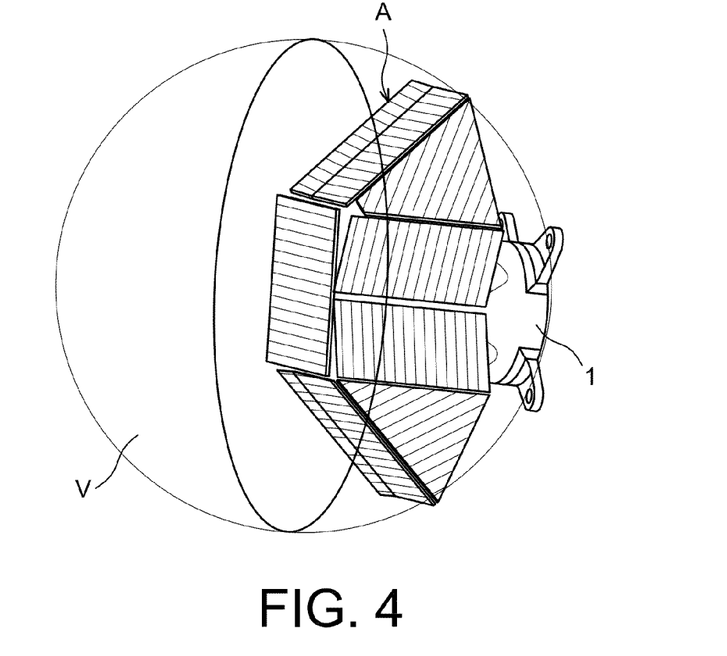
FIG. 4 shows a perspective view of an onboard weather radar antenna according to the invention in the volume V defined by the ARINC standard.

FIG. 4 shows a perspective view of an example of an onboard weather radar antenna according to the invention in the volume V defined by the ARINC standard. The different panels p1-p13 are fixed on the mechanical support 1, each of the panels p1-p13 being fixed to the mechanical support by any means known in itself. The radar antenna panels according to the invention are not rotated in azimuth and are not rotated in elevation as defined above. Therefore the different panels p1-p13 do not move in the volume V defined by the ARINC standard. Therefore the dimensions of the radar antenna panels according to the invention are smaller than the dimensions of a panel according to prior art. This characteristic of the invention advantageously makes it possible to envisage reducing the length of aircraft.

Figure 5A:
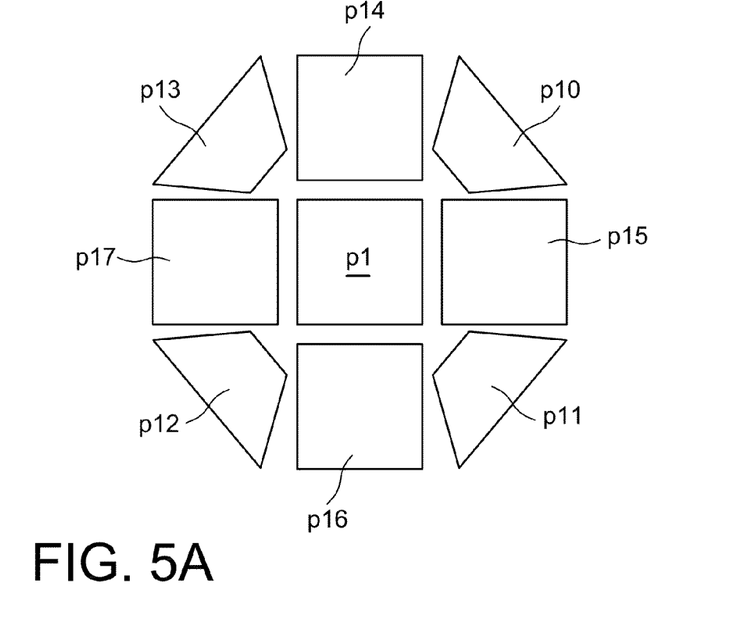
FIGS. 5A and 5B show top views of antenna panels according to other embodiments of the invention.
Figure 5B:
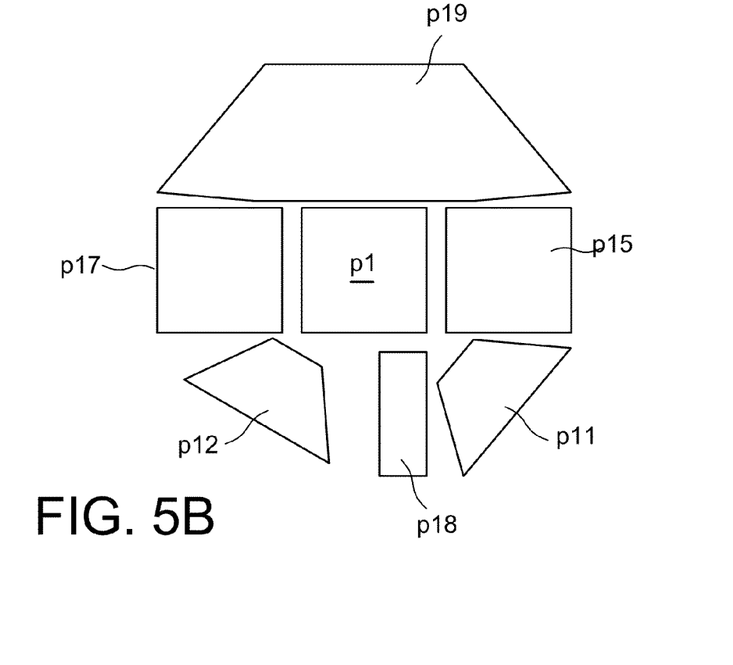

FIGS. 5A and 5B show non-limitative examples of top views of antenna panels according to other embodiments of the invention.

FIG. 5A shows a structure almost identical to the structure in FIG. 3A. The only difference between the structure in FIG. 5A and the structure in FIG. 3A is that the rectangular panels adjacent to the radar antenna in FIG. 3A are replaced by a single panel. Panel p14 replaces panels p2 and p3. Panel p15 replaces panels p4 and p5. Panel p16 replaces panels p6 and p7. Panel p17 replaces panels p8 and p9.

FIG. 5B shows a structure in which the different panels that surround the main panel p1 are very different from each other. There are two rectangular panels p15 and p17, two almost isosceles triangular panels p11 and p12, a rectangular panel p18 and a large quasi-trapezoidal panel p19. The angle θ between the surface defined by each panel and the surface S defined by the panel p1 is either different for different panels, or is exactly the same for at least two of the panels in the set of panels. The angle θ may for example be chosen as mentioned above with reference to FIG. 3C.

Very generally, the radar antenna according to the invention comprises a main panel (p1) with a plane surface capable of transmitting and/or receiving an electromagnetic wave and a plurality of peripheral panels (p1, p2, etc.) arranged around the main panel and each with a surface capable of transmitting and/or receiving an electromagnetic wave, the peripheral panels being inclined relative to the plane surface of the main panel and located on the same side of a plane that contains the plane surface of the main panel.

The main panel may have any arbitrary shape. Preferably, the main panel is rectangular or circular. The peripheral panels may also have any arbitrary shape. Preferably, the peripheral panels are plane. According to other embodiments of the invention, the surface of all or some of the peripheral panels is not plane and has a radius of curvature.

Figure 6:
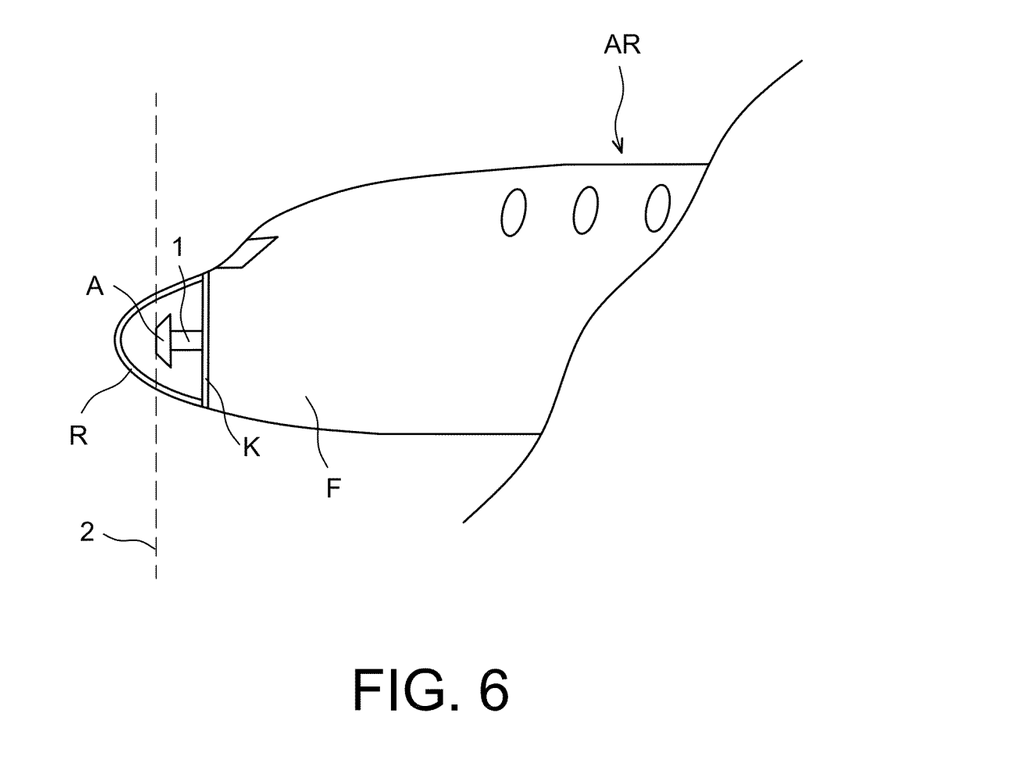
FIG. 6 shows an aircraft equipped with an onboard weather radar antenna according to the invention.

FIG. 6 shows an aircraft fitted with a weather radar antenna according to the invention.

The aircraft AR comprises a fuselage F and a radome R fixed to the fuselage. The radome R delimits a housing and forms the nose cone of the aircraft. The radar antenna is placed in the housing delimited by the radome. More generally however, the radar antenna according to the invention may be installed at different locations in the aircraft, particularly on the wings of aircraft in the case of sea patrol aircraft, under the belly or in the tail of aircraft, or even in external pods fixed to the fuselage or to the wings.

The fuselage comprises a sealed bulkhead K that closes the radome housing. An antenna A conforming with the invention is placed in the housing and fixed to the mechanical support 1, preferably at the plane surface of the main panel, and the mechanical support 1 is itself fixed to the fuselage. The mechanical support 1 may for example be fixed to the sealed bulkhead K or to a peripheral frame forming part of the fuselage and surrounding the sealed bulkhead K.

The plane surface of the main panel of the radar antenna A defines a plane 2. According to a first variant of the invention, the mechanical support 1 is placed on the same side of the plane 2 as the peripheral panels of the radar antenna. The peripheral panels are then inclined towards the back of the aircraft. According to another variant of the invention (not shown in the figures), the mechanical support 1 and the peripheral panels are not located on the same side of the plane 2. The peripheral panels are then inclined towards the forward direction of the aircraft. In one particular embodiment, the mechanical support 1 enables rotation of the antenna about an axis perpendicular to the plane that defines the plane surface of the main panel of the antenna. Preferably, this axis is parallel to the longitudinal axis of the aircraft. This antenna rotation is advantageously capable of scanning the entire space in front of the aircraft.

Figure 7A:
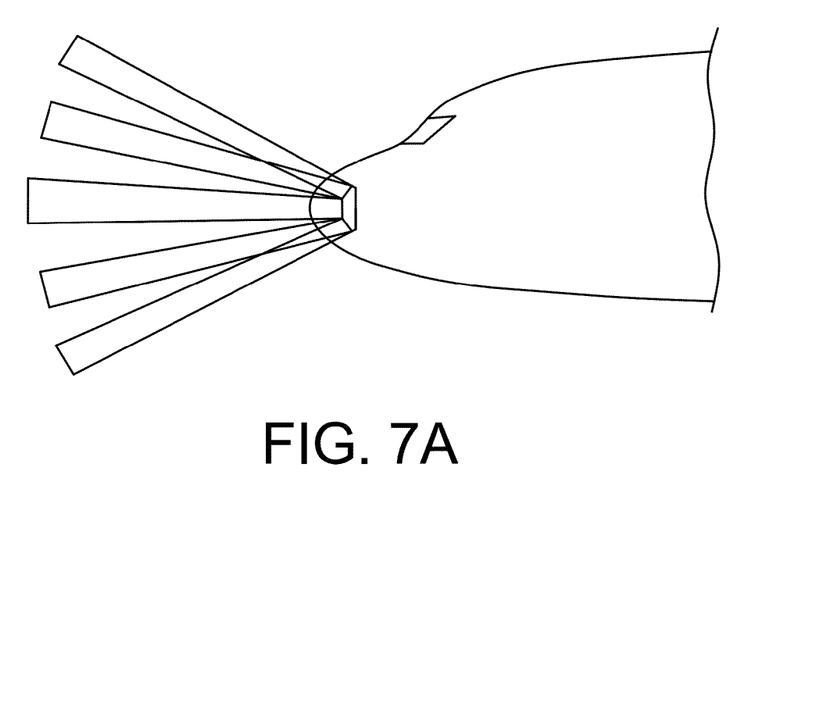
FIGS. 7A and 7B show a cross-sectional view and a front view of the radiation that could be emitted by an antenna according to the invention in the theoretical case in which all panels that make up the antenna are radiating simultaneously, to clarify the description.
Figure 7B:
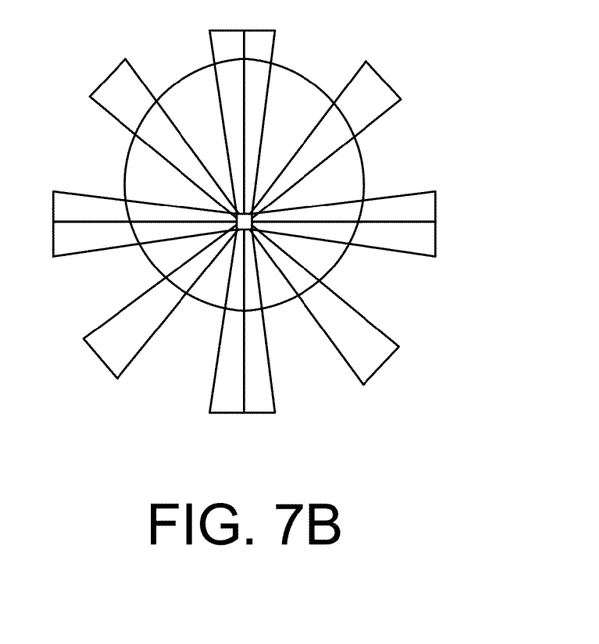

FIGS. 7A and 7B show a cross-sectional view and a front view respectively of the radiation that would be emitted by a radar antenna according to the invention in the theoretical case in which all panels that form the radar antenna radiate simultaneously, to clarify the description.

It can be seen in FIGS. 7A and 7B that the zones in the space in front of the nose cone of the aircraft are not affected by the emitted radiation. As mentioned previously, the panels in the radar antenna according to the invention do not all radiate at the same time. The result is that the dead zones facing the aircraft define an even larger volume than that shown in FIGS. 6A and 6B, at all times.

Figure 8A:
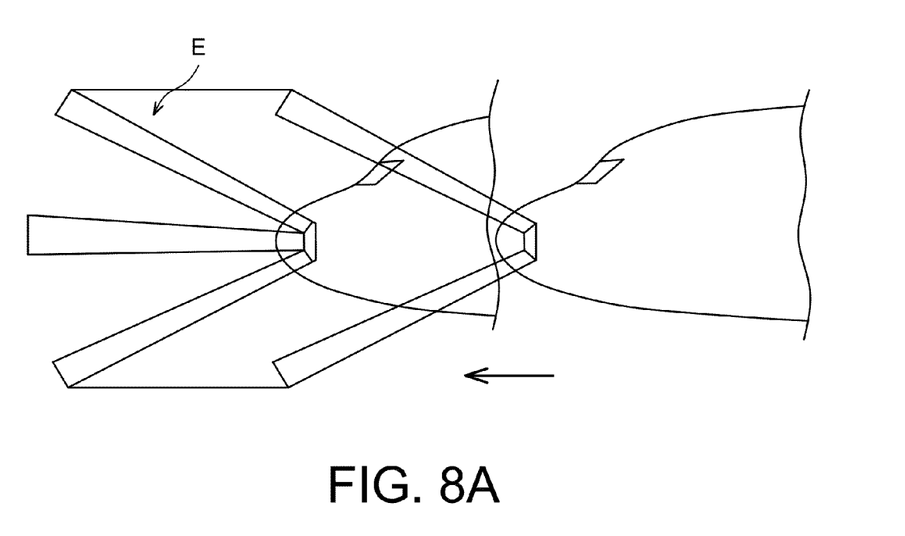
FIGS. 8A and 8B show a cross sectional view and a front view respectively of radiation emitted by an antenna according to the invention over time between two different positions of an aircraft trajectory.
Figure 8B:
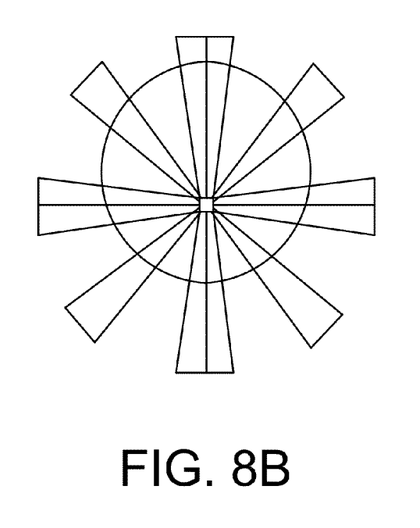
Figure 9:
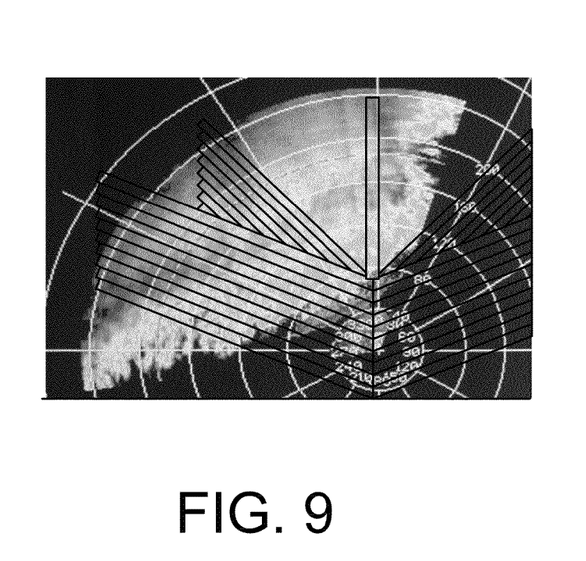
FIG. 9 symbolically shows construction of a radar image on the display screen of the aircraft onboard computer according to a particular embodiment of the invention.

However, as can be seen in FIGS. 8A, 8B and 9, as soon as the aircraft is in motion, there is a displacement distance of the aircraft, and consequently an aircraft displacement time, in which the space in front of the aircraft is visible by the radar within a certain angular aperture and a certain depth. FIG. 8A symbolically shows the two extreme positions of the aircraft for which a sequence of radiation sequences during a duration ΔT will be used to define an observation space E with no dead zones, over a certain depth. For example, the duration ΔT may be of the order of a few seconds. An example construction of the space E is shown in FIG. 9.

During the duration ΔT, each panel of the radar antenna radiates an electromagnetic wave according to the selected sequence of radiation sequences, at least once. In a manner known in itself, after the wave that it emitted has been reflected, each panel in the radar antenna receives a reflected wave that is detected by a detection circuit. The signals detected over the time ΔT by the set of detection circuits associated with all panels of the radar antenna are transmitted to a computer. The computer then creates a geopositioning signal based on the detected signals and time data that characterize the sequence of transmission/reception sequences. The geopositioning signal contains geopositioning data capable of locating obstacles located in front of the aircraft. A radar image created using the geopositioning signal is displayed on the computer screen.

Figure 10:
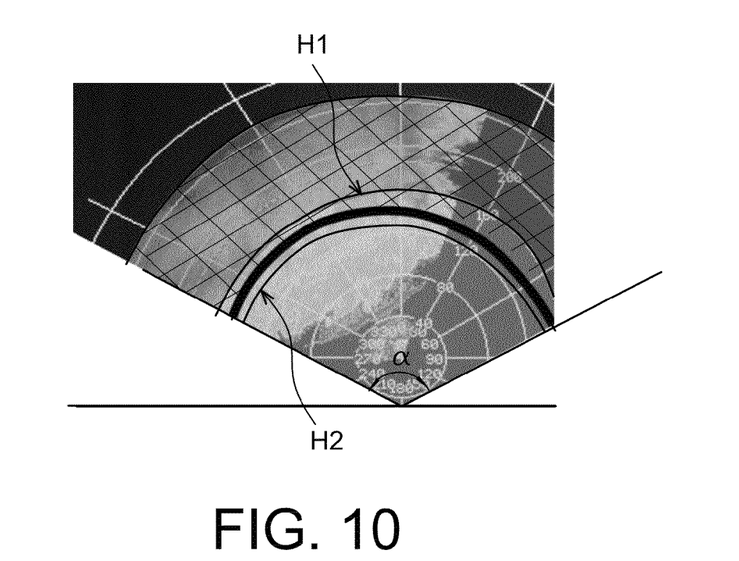
FIG. 10 shows a distribution of display zones on the display screen of the onboard computer of the aircraft, according to airworthiness instructions related to the display of weather data (ARINC standard)

FIG. 10 shows a comparison between the observation depth obtained by an antenna according to the invention and the observation depth required by the ARINC standard, within a given aperture angle α. It can be seen in FIG. 9 that the horizon H1 that corresponds to the depth obtained with the antenna according to the invention is advantageously located beyond the horizon H2 corresponding to the depth required by the ARINC standard. However, there is no visibility beyond the horizon H1.

Figure 11A:
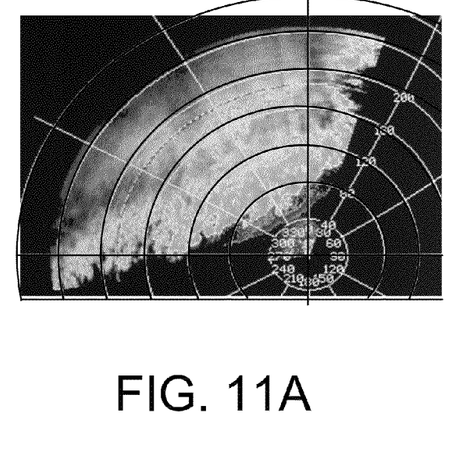
FIGS. 11A and 11B show a first improvement of the invention capable of improving the display performances of weather data recorded by an antenna according to the invention.
Figure 11B:
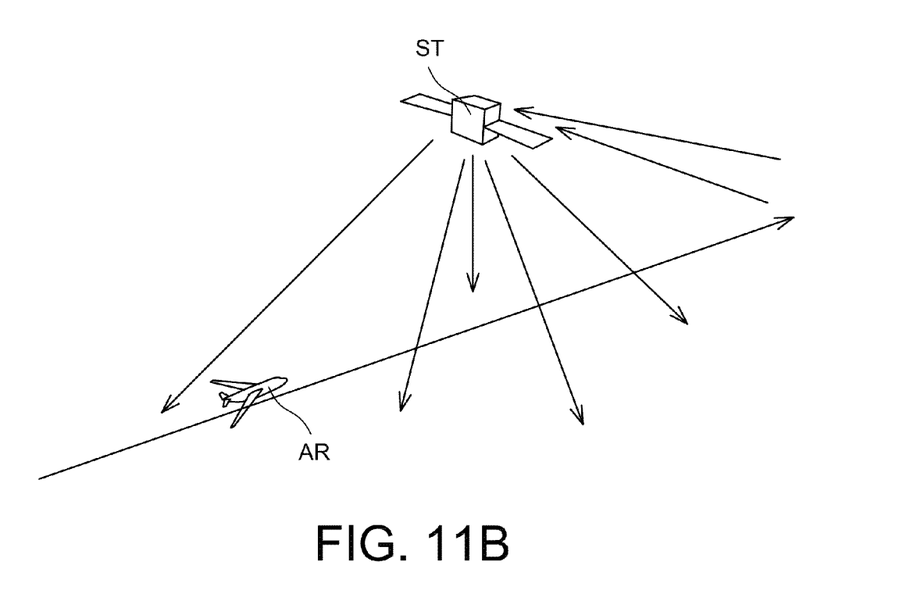

One improvement of the invention is intended to improve the observation depth obtained with a radar antenna according to the invention. FIG. 11A shows the radar image obtained with this improvement and FIG. 11B shows the system that is used to give the radar image in FIG. 11A.

According to this improvement, complementary information about weather data located beyond the horizon H1 is transmitted to the aircraft AR from a satellite ST. The aircraft AR is then provided with electronic means capable of receiving data from the satellite ST and processing and displaying data thus received consistently with data received by the radar antenna according to the invention. Weather data transmitted by the satellite ST may advantageously be related to weather conditions very far from the aircraft. Depending on the circumstances, it is then possible to envisage changes to the aircraft trajectory to avoid storm areas.

Figure 12A:
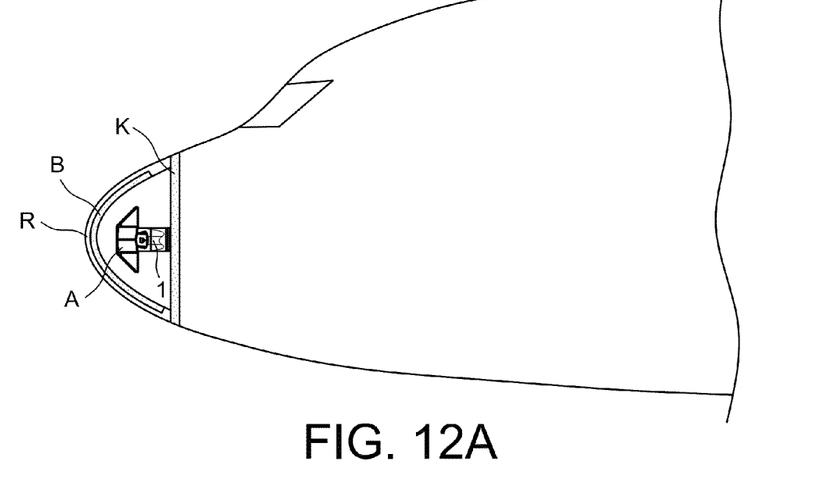
FIGS. 12A and 12B show two improvements of the invention resulting from the geometry of the antenna according to the invention.
Figure 12B:
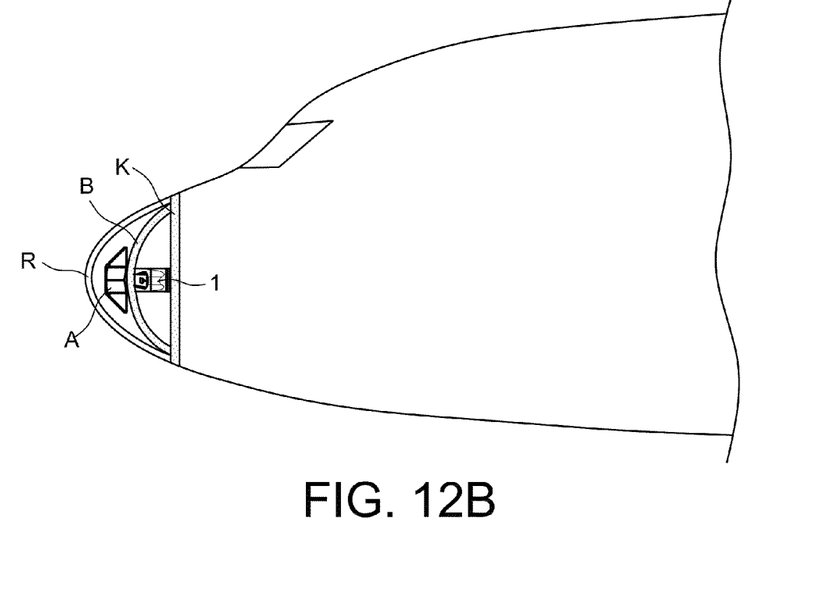

FIGS. 12A and 12B show the position of the bird strike shield in the nose cone of the aircraft.

According to the embodiment shown in FIG. 12A, the bird strike shield B is included directly in the radome. The bird strike shield is then made from a material transparent to electromagnetic waves radiated by the radar antenna, for example an auxetic material.

According to the preferred embodiment of the invention shown in FIG. 12B, the bird strike shield B is located between the radar antenna A and the sealed bulkhead K of the aircraft. This position is possible due to the shape of the antenna that enables panels in the antenna to move towards the nose cone of the aircraft. Advantageously, the bird strike shield B is in the form of a dome, the base of which is fixed to the fuselage close to the periphery of the sealed bulkhead K, and the top of which is left open to allow the mechanical support 1 to pass through. This shape of the bird strike shield is particularly advantageous because it defines a more efficient protection than is possible with the bird strike shield according to prior art.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft comprising:
   a fuselage and
   a radome fixed to the fuselage,
      the radome defining a housing,
      the fuselage comprising a sealed bulkhead closing the housing,
   a weather radar antenna comprising a main panel with a plane surface capable of transmitting and receiving an electromagnetic wave and a plurality of peripheral panels arranged around the main panel and each having a surface capable of transmitting and receiving an electromagnetic wave,
      the peripheral panels being inclined from the plane surface of the main panel and located on the same side of a plane that contains the plane surface of the main panel,
      the antenna being contained in the housing and mounted on the fuselage through a mechanical support,
      the mechanical support being fixed firstly to the fuselage and secondly to the weather radar antenna on the same side of the plane that contains the plane surface of the main panel of the antenna as the peripheral panels of the antenna,
   a bird strike shield located between the antenna and the sealed bulkhead,
      said shield being in the form of a dome with a top and a base,
      the base being fixed to the aircraft fuselage and an opening being formed at the top of the dome through which the mechanical support can pass.

2. The aircraft according to claim 1, wherein the peripheral panels are all inclined at the same angle from the plane surface of the main panel.

3. The aircraft according to claim 1, wherein the peripheral panels are plane.

4. The aircraft according to claim 1, wherein the mechanical support is capable of moving the weather radar antenna in rotation about an axis perpendicular to the plane that contains the plane surface of the main panel of the antenna.

* * * * *